United States Patent [19]

Evans et al.

[11] Patent Number: 5,735,047
[45] Date of Patent: Apr. 7, 1998

[54] BALL VALVE ASSEMBLY AND METHOD FOR FORMING

[75] Inventors: Robert J. Evans, Fort Wayne; Mark W. Schuller, Woodburn; Kraig A. Biberstein, New Haven, all of Ind.; Anna K. Rambo, Ashland, Ohio

[73] Assignee: Aeroquip Corporation, Maumee, Ohio

[21] Appl. No.: 730,095

[22] Filed: Oct. 15, 1996

Related U.S. Application Data

[60] Provisional application No. 60/014,224, Mar. 27, 1996.
[51] Int. Cl.$^6$ ...................................................... B21D 39/04
[52] U.S. Cl. .......................................... 29/890.13; 29/510
[58] Field of Search ............................. 29/510, 890.13; 137/315.14

[56] References Cited

U.S. PATENT DOCUMENTS

| | | |
|---|---|---|
| 2,973,182 | 2/1961 | Gill .................................. 251/315.14 X |
| 2,976,907 | 3/1961 | Harvey et al. . |
| 3,919,756 | 11/1975 | Kajrup . |
| 4,266,566 | 5/1981 | Kacal et al. . |
| 4,611,374 | 9/1986 | Schnelle et al. . |
| 5,488,972 | 2/1996 | McCracken et al. . |

FOREIGN PATENT DOCUMENTS

| | | |
|---|---|---|
| 1 964 204 | 6/1971 | Germany . |
| 39 05 241 C1 | 10/1990 | Germany . |
| 92 03 312.0 | 7/1993 | Germany . |
| 60129476 | 7/1985 | Japan . |
| 0229633 | 9/1990 | Japan .................................. 29/890.13 |
| 1089447 | 11/1967 | United Kingdom . |
| 2 199 119 | 6/1988 | United Kingdom . |

OTHER PUBLICATIONS

Aeroquip Bulletin, RB01 Series Ball Valves, KA28B, 6 pages.

Maxwell Bulletin 1202A, Mangeform 7000 Series, "a new generation of electromagnetic metalforming and assembly equipment", 6 pages.

Maxwell Bulletin 1201R, "MAGNEFORM offers a dimensions in shaping and assembling metals", 4 pages.

Tool and Manufacturing Engineers Handbook, vol. II Forming, 26 pages.

Primary Examiner—John Fox
Attorney, Agent, or Firm—Emch, Schaffer, Schaub & Porcello, Co., L.P.A.

[57] ABSTRACT

A rotary ball valve assembly and method for forming utilizes a compression spring subjected to a non-torsional, axially directed compressive force to urge an annular seal into sealing engagement with a rotatable ball and, while so subjected, inwardly deforming a tubular member attached to the housing by an electromagnetic force to form an annular abutment retaining said compression spring.

13 Claims, 9 Drawing Sheets

FIG. 9

BALL VALVE ASSEMBLY AND METHOD FOR FORMING

CROSS REFERENCE TO RELATED APPLICATION

This application is related to Provisional patent application Ser. No. 60/014,224 filed Mar. 27, 1996.

BACKGROUND OF THE INVENTION

The present invention relates to a rotary ball valve assembly and a method for forming such assembly efficiently and economically to provide a leak-proof assembly ready for installation in a fluid flow line. Rotary ball valves are frequently sold with short lengths of copper tubing brazed thereto which function as stubs suitable for brazing to a fluid flow line at the site where the valve is desire to be installed. The prior art rotary ball valve assemblies typically include a housing containing the rotary ball valve, seals and/or seats, one on each side of the ball, a spring urging the seals or seats into sealing engagement with the ball and a separately formed threaded collar threadedly engaged to the body and compressing the spring. Some prior art valves omit the spring and rely on the threaded collar to compress the seals and/or seats into sealing engagement with the ball.

One such type of prior art valve is manufactured by Aeroquip Corporation, the assignee of the present application, and sold under its Part No. RB01-004-141414. Such prior art rotary ball valve assemblies are provided with a stub at each of the inlet and outlet ends. One of such stubs is brazed to the collar which is threadedly engaged to the housing and the other stub is brazed to the housing itself. A type of spring frequently utilized to apply compressive loads within the assembly is a stainless steel wave spring formed from a single strip or length of metal having a wave pattern with alternating crests and grooves. The strip of metal is wound to form a coil in which the outer periphery of each of the plurality of individual coils generally define a cylinder of a size permitting the spring to be received in a cylindrical length of tubing. The strip is wound such that the grooves of any given coil or wave are each aligned with a crest of the adjacent coil and with a groove of the next alternate coil or wave. This alignment results in alternating contact points and gaps around the periphery of pairs of adjacent coils or waves.

In applying the threaded collar to the housing in prior art rotary ball valve assemblies, the collar directly contacts the spring prior to becoming fully engaged. Further rotation of such collar following its initial contact with the spring as it is rotated on the threads of the collar to its fully engaged, sealing position, places a torsional load on the spring. Such torsional load applied to the spring has a tendency to rotate coils or waves closest to the collar relatively to the coils or waves which are closer to the rotary ball valve with the result that the aligned grooves and crests of adjacent coils or waves may become dislocated from one another so that some of the crests of one coil will be aligned with crests of an adjacent coil. Such dislocation causes the spring to have less compressive force than intended when the aligned grooves and crests are fully in aligned contact with one another.

DISCLOSURE OF THE INVENTION

Under the present invention, there is provided a rotary ball valve assembly and a method for assembling which is potentially less expensive than the prior art rotary ball valve assemblies of comparable size in that it eliminates the need for a separately formed threaded collar and has superior leak-proof capability over prior art rotary ball valves. The rotary ball valve of the present invention is particularly well suited for use in air conditioning and refrigeration applications.

Under the method of assembling the rotary ball valve assembly of the present invention, an electromagnetic forming process is utilized to radially inwardly deform an annular portion of a copper stub brazed to the housing. Prior to deforming such annular portion, the rotary ball is positioned in the housing with a seal on one side and a seat on the other side along with a compression spring and, preferably, a rigid washer on the opposite side of the spring from the seat. With the parts so positioned, a direct linear axial load is applied to the spring and washer and, while the members are subjected to such load, an electromagnetic force is applied to cause an annular portion of the stub immediately adjacent the spring and washer to be radially deformed inwardly thereby securing the assembly of the seal, ball, seat, spring and washer. The straight linear load applied to the spring during the step of electromagnetic forming of the stub radially inwardly ensures that the spring will maintain the optimal compressive force holding the seal and seat sealingly engaged to the ball, thus providing a reliable, leak proof rotary ball valve assembly and doing so at a cost significantly lower than that of the aforementioned prior art rotary ball valve assembly.

BEST MODE OF CARRYING OUT INVENTION

Figure 1:
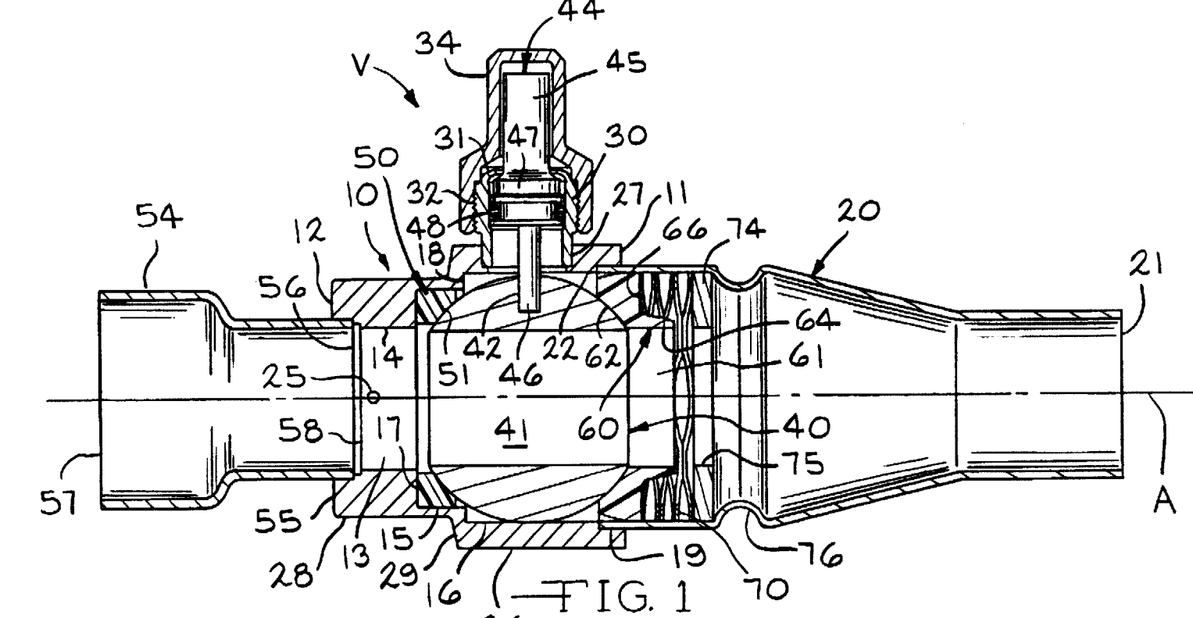
FIG. 1 is a sectional view of the rotary ball valve assembly of the present invention.

Referring to FIG. 1, there is shown a completed rotary ball valve assembly V which includes a housing or body member 10 extending along an axis A from an inlet end 11 to an outlet end 12. Preferably, the body member 10 is formed of brass; however, it could be formed of other suitable metals such as copper with a brass lining. The body member 10 includes a passageway 13 extending along an axis A from the inlet end 11 (factory side) to the outlet end 12 (field side). The body member 10 includes a first inwardly facing cylindrical wall section 14 which is spaced a short distance from the outlet end 12, a second and larger inwardly facing cylindrical wall section 15 and a third, and still larger, inwardly facing cylindrical wall section 16 which extends substantially to the inlet end 11. A first shoulder 17 joins the first inwardly facing cylindrical wall 14 to the second inwardly facing wall 15 and a second shoulder 18 joins the second inwardly facing cylindrical wall 15 to the third inwardly facing cylindrical wall 16.

Figure 2:
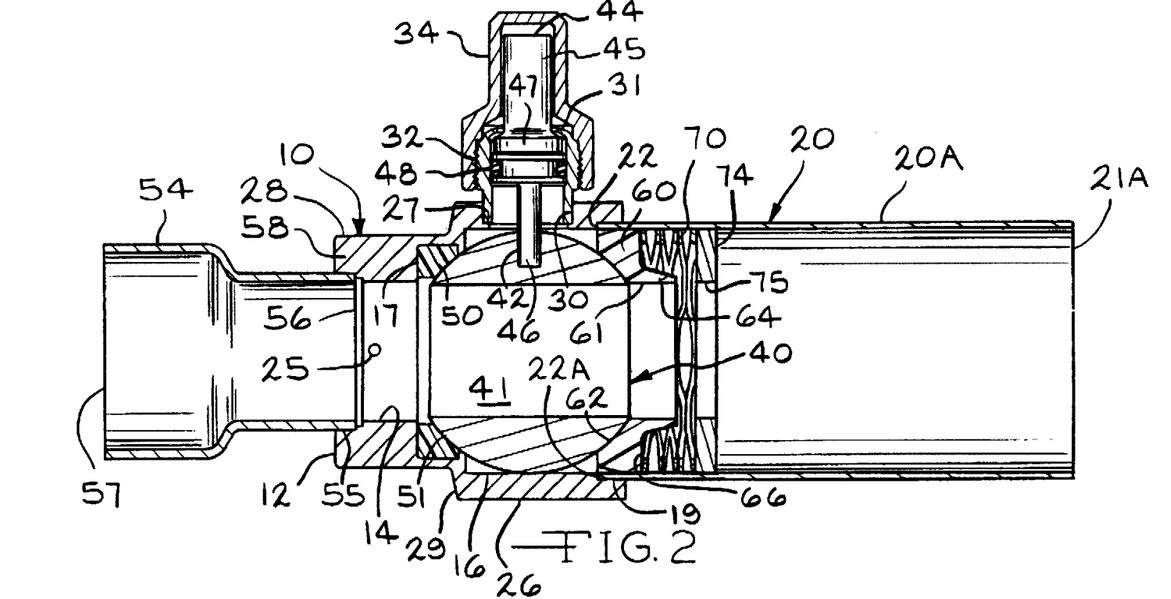
FIG. 2 is a sectional view of a partial assembly of the rotary ball valve assembly of the present invention immediately prior to the steps of linearly compressing the spring and radially inwardly deforming an annular portion of the stub to retain the washer, spring and other components in the housing.

The inlet end 11 is provided with a first counter bore 19 which is sized to receive one end of a factory stub 20. As can be seen in FIG. 2, the factory stub 20, prior to being reshaped and deformed to the configuration shown in FIG. 1, is a cylindrical length of stub tubing 20A. The stub tubing 20A extends from a first end 21A to a second end 22A sized to be snugly received in the first counter bore 19 of the body member 10 and brazed therein by conventional means for sealing engagement to the body member 10.

The body member 10 may have an affixed thereto at its outlet end 12 a field stub 54. The body member 10 is provided with a second counter bore 55 which is slightly larger in diameter than the diameter of the first inwardly facing cylindrical wall 14. The field stub 54 extends along axis A from an engagement end 56 to a free end 57. The engagement end 56 is positioned in the second counter bore 55 and is brazed thereto. If desired, a third counter bore 58 may be formed having a diameter greater than the diameter of the first inwardly facing cylindrical wall 14, but smaller than the diameter of the second counter bore 55. Such third counter bore 58 will function as a braze catcher to catch excess brazing material. If desired, an additional counter bore (not shown) may be formed between the first counter bore 19 and the third cylindrical wall portion 16 to function as a braze catcher for the factory stub 20.

Figure 7:
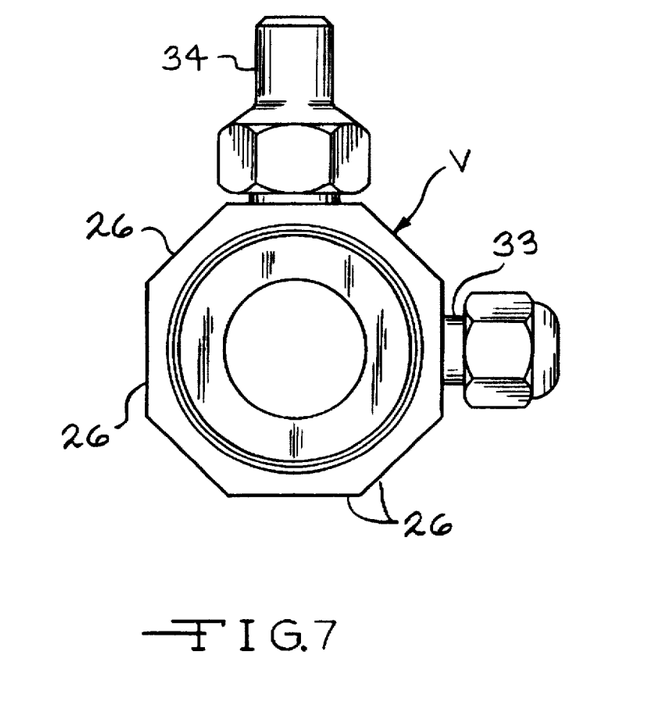
FIG. 7 is in end view of the assembled rotary ball valve assembly of the present invention.

The portion of the body member 10 defining the third inwardly facing cylindrical wall portion 16 has an exterior which is enlarged from other portions of the body member and has a series of eight outwardly facing flat faces 26 which, as may be seen in viewing FIG. 7, substantially define an octagon. The portion of the body member 10 between the outlet end 12 and the flat faces 26 has an outwardly facing cylindrical wall portion 28 and a shoulder 29 extending therefrom generally radially outwardly to the flat faces 26. A charge port access passageway 25 extends radially through the wall of the body member between the outlet end 12 and the shoulder 29 and communicates with the passageway 13 in the area of the first inwardly facing cylindrical wall 14. A charge port 33 is attached to such wall in communication with the access passageway 25 (see FIG. 7). A radial aperture 27 extends through the body member from one of the flat faces 26 to the third inwardly facing cylindrical wall 16.

An actuation port 30 is brazed or otherwise suitably affixed in the aperture 27. The actuation port 30 extends from the end connected in the aperture 27 to a free end 31 which is bent inwardly to define a restricted opening smaller in size than the remainder of the interior wall portion of the actuation port. The actuation port 30 is also provided with outwardly facing threads 32 to which may be affixed a cap 34.

Positioned in the body member 10 is a rotary ball 40 having a central passage 41 which, when the ball is rotated to the open position as shown in FIG. 1, is aligned with the axis A. An elongated slot 42 is formed in the ball and the ball 40 is positioned such that the slot 42 is facing the aperture 27.

Extending through the aperture 27 and mounted in the actuation port 30 is a stem 44. The stem 44 extends from an actuation knob 45 extending outwardly from the actuation port 30 to a substantially flat probe 46 which is sized to be snugly received in the slot 42 of the ball. The actuation knob 45 has opposed flat surfaces which may be gripped by a wrench for rotating the stem and the ball 40 with its slot 42 engaged by the probe 46. The stem 44 has an enlarged cylindrical portion 47 which is engaged by the restricted opening free end 31 of the actuation port, which free end 31 serves to retain the stem 44 in the actuation port while permitting rotation thereof. The stem 44 is provided with an annular groove in which is positioned an O-ring 48 for preventing the escape of fluid.

As will be readily appreciated, rotation of the stem 44 rotates the ball from a closed position at which the central passageway 41 is at right angles to the axis A to the open position shown in FIG. 1 at which the central passage 41 is aligned with the axis A and is open to receive fluid entering from the factory stub 20 and transmit it to the outlet end 12 and the field stub 54 brazed thereto.

As can be seen in FIG. 1, an annular seal 50, formed of PTFE or other suitable material capable of effecting a fluid-tight seal against the spherical surface of the ball 40 is positioned against the first shoulder 17 and is sized to be in sealing engagement with the second inwardly facing cylindrical wall 15 and the shoulder. The seal 50 also includes a curved face 51 having a contour matching the spherical exterior surface of the ball 40 in order to effect the sealing engagement therewith when the ball 40 is urged thereagainst.

The portion of the rotary valve assembly thus far described is substantially like that of the aforesaid Aeroquip RB01 Series Ball Valves disclosed in Aeroquip Catalog KA28B.

As can be seen by comparing FIGS. 1 and 2, the factory stub 20, prior to its electromagnetic deformation and subsequent shaping to the contour shown in FIG. 1 was simply a cylindrical tube 20A which extended from the engagement end 22A to a free end 21A with the cylindrical tube 20A brazed to affix the engagement end 22A positioned in the first counter bore 19 of the body member 10. A seat 60 formed of polyphenylene sulphide or other suitable plastic material is positioned in engagement with the ball 40. The seat 60 has an annular configuration with a passageway 61 extending along the axis A, a spherical surface 62 contoured to engage the ball 40, a nose 64 and a shoulder 66 extending radially outwardly from the nose 64.

A compression spring 70 engages the shoulder 66. The compression spring 70 is formed from a single strip of metal, preferably stainless steel, which has been wound in a spiral and following an undulating path from end-to-end. The undulating path forms alternating troughs and crests resembling a wave and wound to have a circular cross-sectional configuration with the trough of one layer contacting the crest of an adjacent layer and with the crest of such one layer being spaced from the trough of such adjacent layer. Although there is contact between the alternatively troughs and crests of adjacent layers of the spring 70, such adjacent layers are not adhered together at such contact points.

Accordingly, as previously discussed with respect to the prior art rotary ball valves, when the separately formed end piece or collar was rotated into engagement with the body member, such rotation, acting upon the portion of the spring closest thereto, had a tendency to twist such closest portion of the spring thereby disengaging some of the troughs from engagement with adjacent crests and displacing such troughs to be aligned with the troughs of the adjacent layer with the result of a significant lose of compressive force imparted by the spring 70. Under the present invention, there is no such twisting motion during assembly with the result that the spring retains the troughs and crests properly aligned and the spring 70 maintains its intended compressive force.

As can be readily seen from the drawings, the nose 64 of the seat 60 extends into the opening of the spring 70 and the size of such opening in relation to the nose 64 is such as to permit the outwardly extending shoulder 66 to be engaged by one end of the spring 70.

A washer 74 having an outer diameter permitting it to be received in the free end 21A of the cylindrical tube 20A is positioned in engagement with the end of the spring 70 on the opposite side of the seat 60. The washer 74 as an aperture 75 which is substantially the same size of the diameter of the ball central passage 41.

The thus assembled components are now ready for the steps involved in the process of radially inwardly deforming an annular portion of the cylindrical tube 20A to form that portion to the final desired configuration of the factory stub 20 as shown in FIG. 1. As can be seen particularly in FIG. 1, the final rotary ball valve assembly has an inwardly extending groove 76 engaging the washer 74 at an axial position such that the spring 70 is maintained under compression urging the seat 60 into sealing engagement with the ball 40 and the ball into sealing engagement with the seal 50.

Referring now to FIGS. 3–6, there is illustrated schematically an electromagnetic machine 80 for assembling the valve assembly of the present invention, including means for compressing the spring 70 such that the seal 50 and seat 60 become sealingly engaged with the ball 40 and, while the spring 70 is so compressed, electromagnetically deforming the cylindrical tube 20A which is to become the factory stub 20 to cause an annular portion adjacent the spring 70 to be radially deformed inwardly to form the groove 76 which retains the spring therein in a permanently compressed state.

Figure 3:
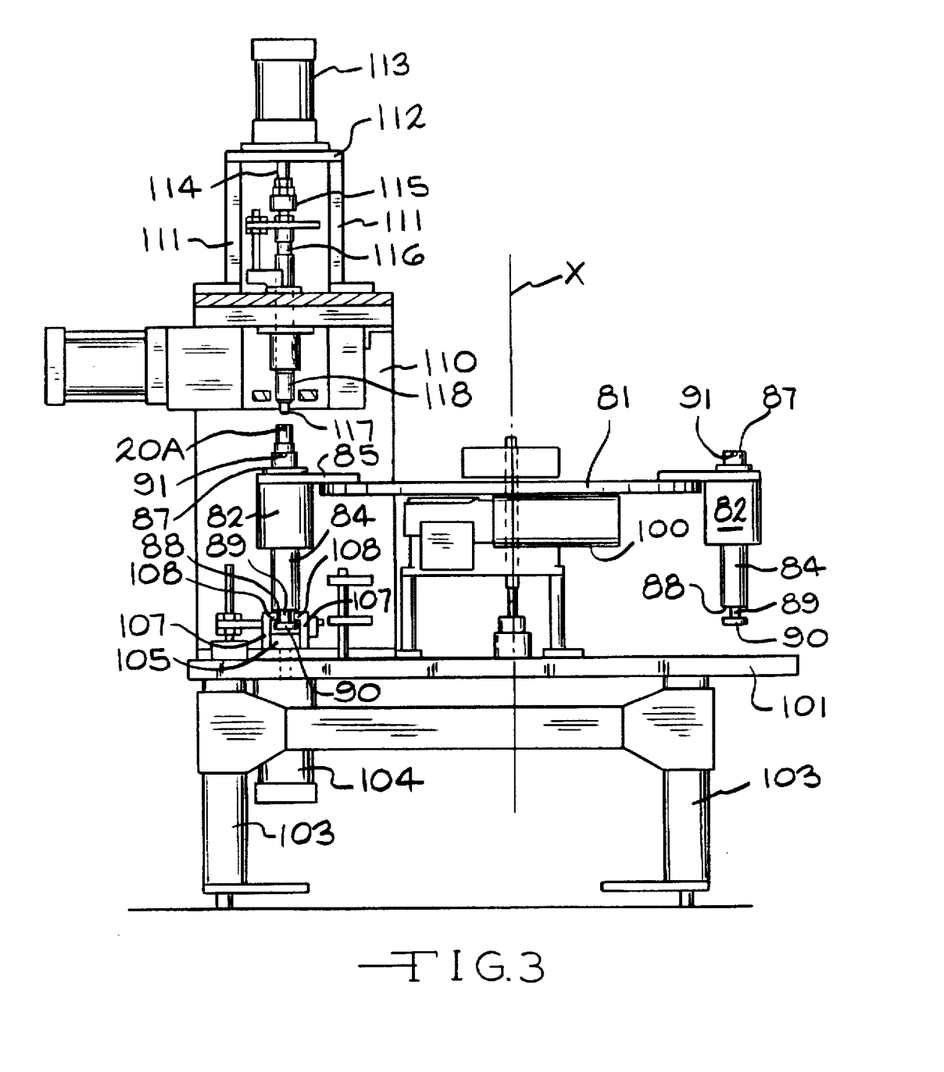
FIG. 3 is an elevational view, partly in section, showing the equipment for electromagnetically forming a radially inwardly extending annular portion of the stub of the assembly of the present invention and showing the components of the assembly FIG. 2 supported in the equipment.
Figure 4:
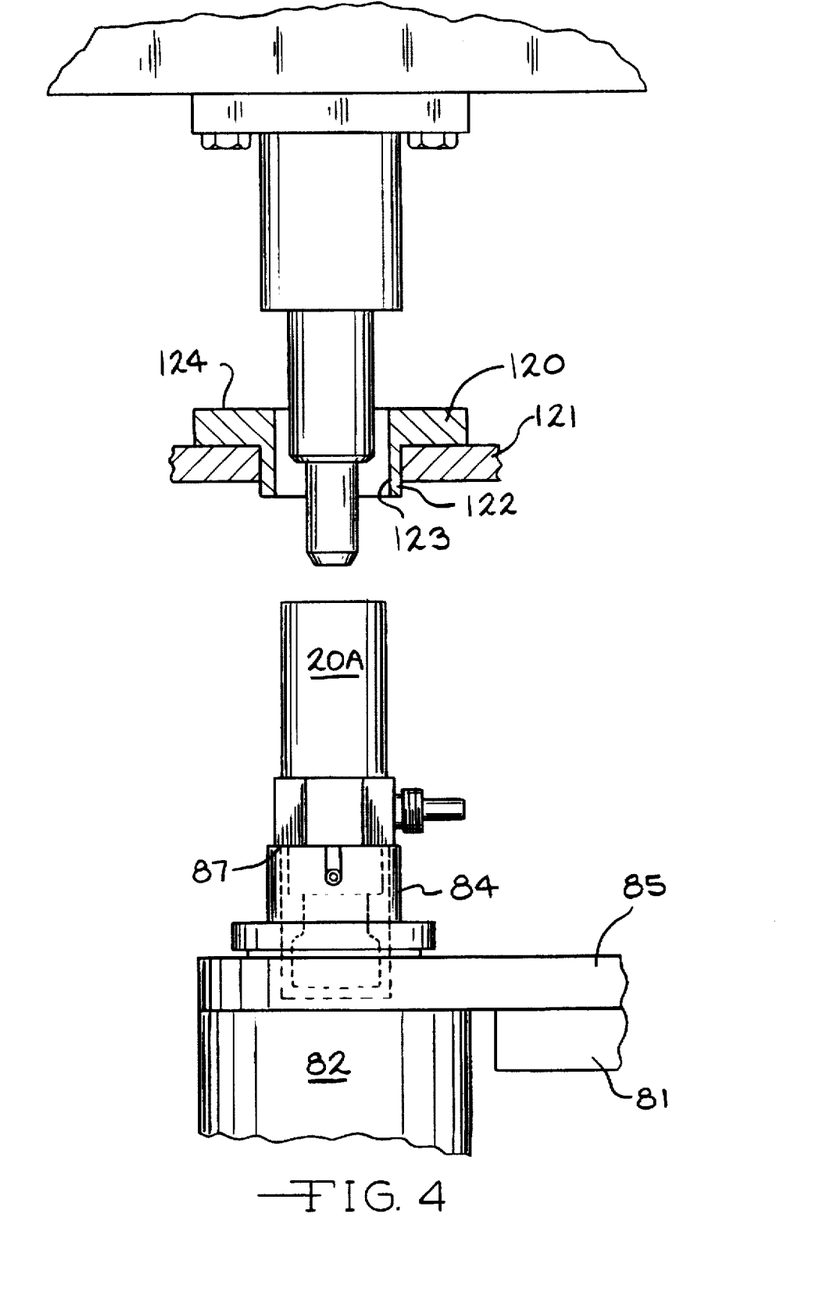
FIG. 4 is an enlarged fragmentary view of a portion of the machine of FIG. 3, but showing the ball valve assembly moved to a position in which the component to be electromagnetically deformed is positioned on the fixture prior to being inserted into the coil for forming.
Figure 5:
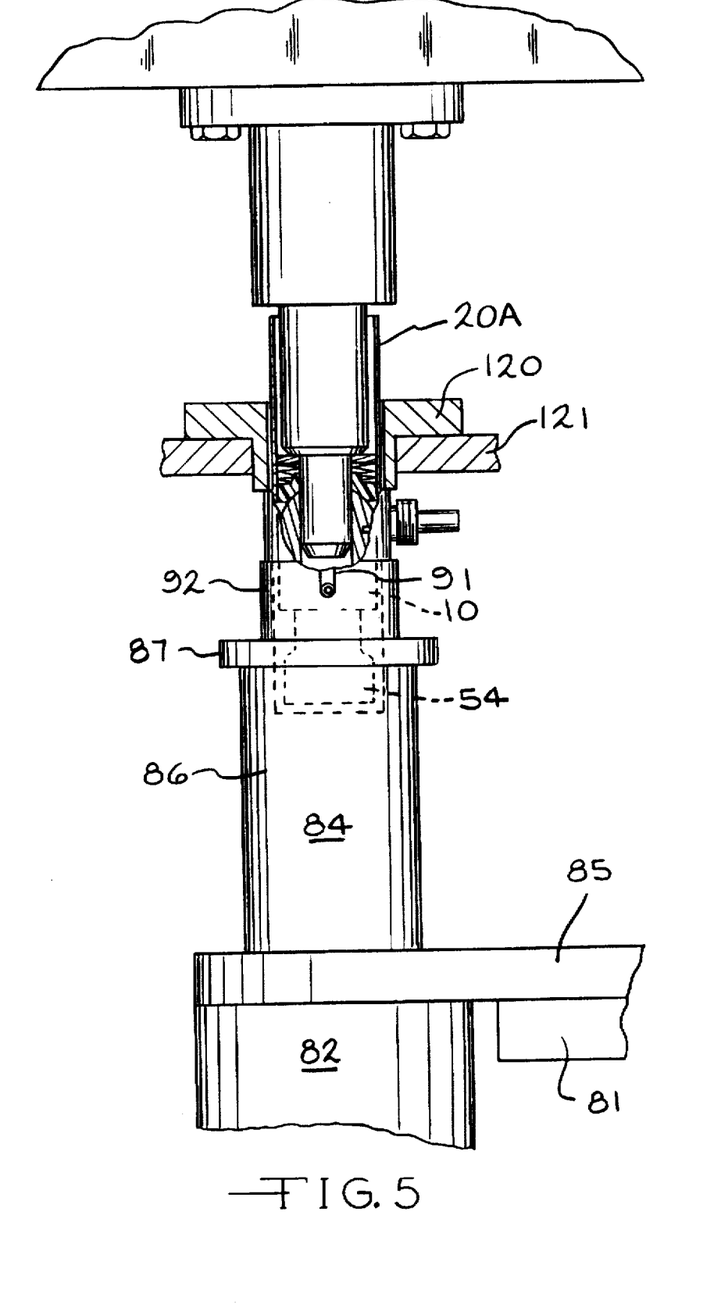
FIG. 5 is a view similar to FIG. 4 showing the relative positioning of the equipment and the assembly components immediately prior to the deforming step and with a linear load being applied to the compression spring.
Figure 6:
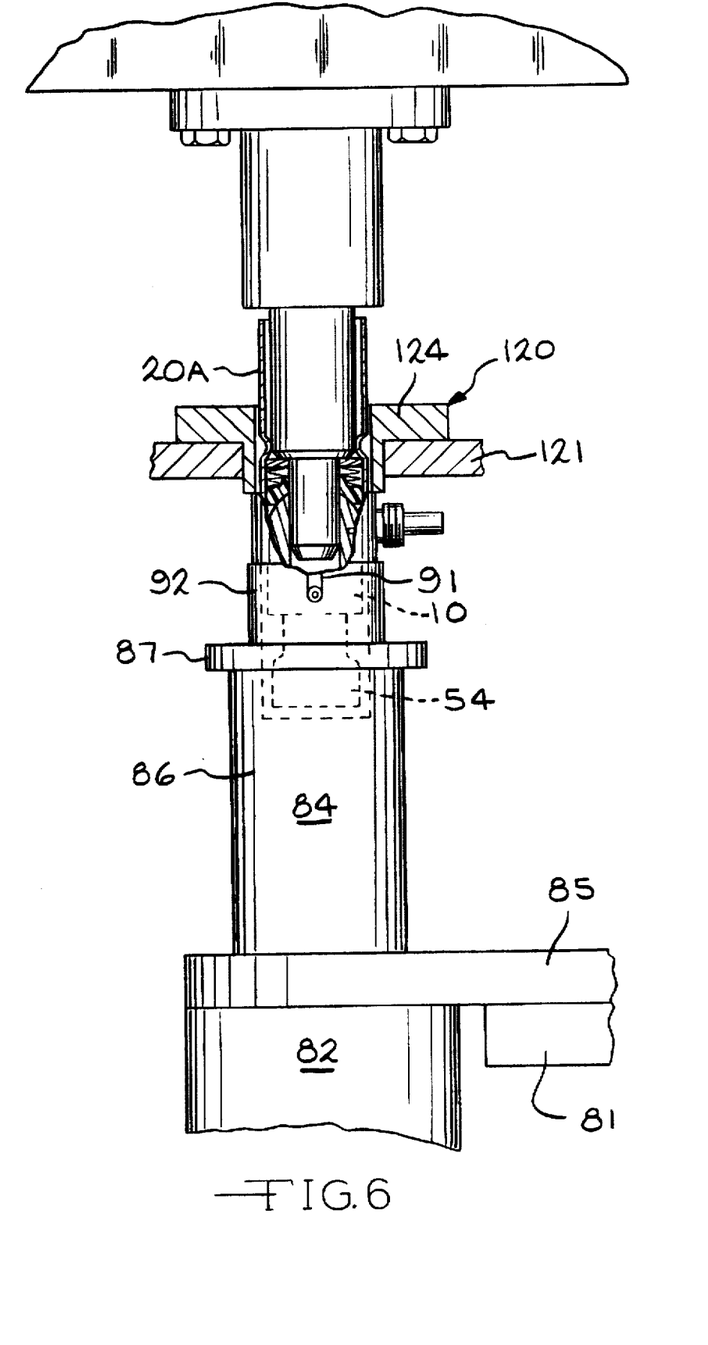
FIG. 6 is a view similar to FIG. 5 showing the relative positioning of the parts immediately following the deforming step.

The machine 80 includes a rotary dial plate 81 mounted for rotation about an axis X and carrying a plurality of housings 82, each of which supports a fixture 84 slideable therein from a lowered position as shown in FIGS. 3 and 4 to an elevated position as shown in FIGS. 5 and 6. Brackets 85 are provided to secure each of the housings 82 to the dial plate 81. Each housing 82 is provided with a sleeve bearing (not shown) which permits its associated fixture 84 to move axially therein from a lowered position of FIGS. 3 and 4 to the raised position of FIGS. 5 and 6.

Figure 8:
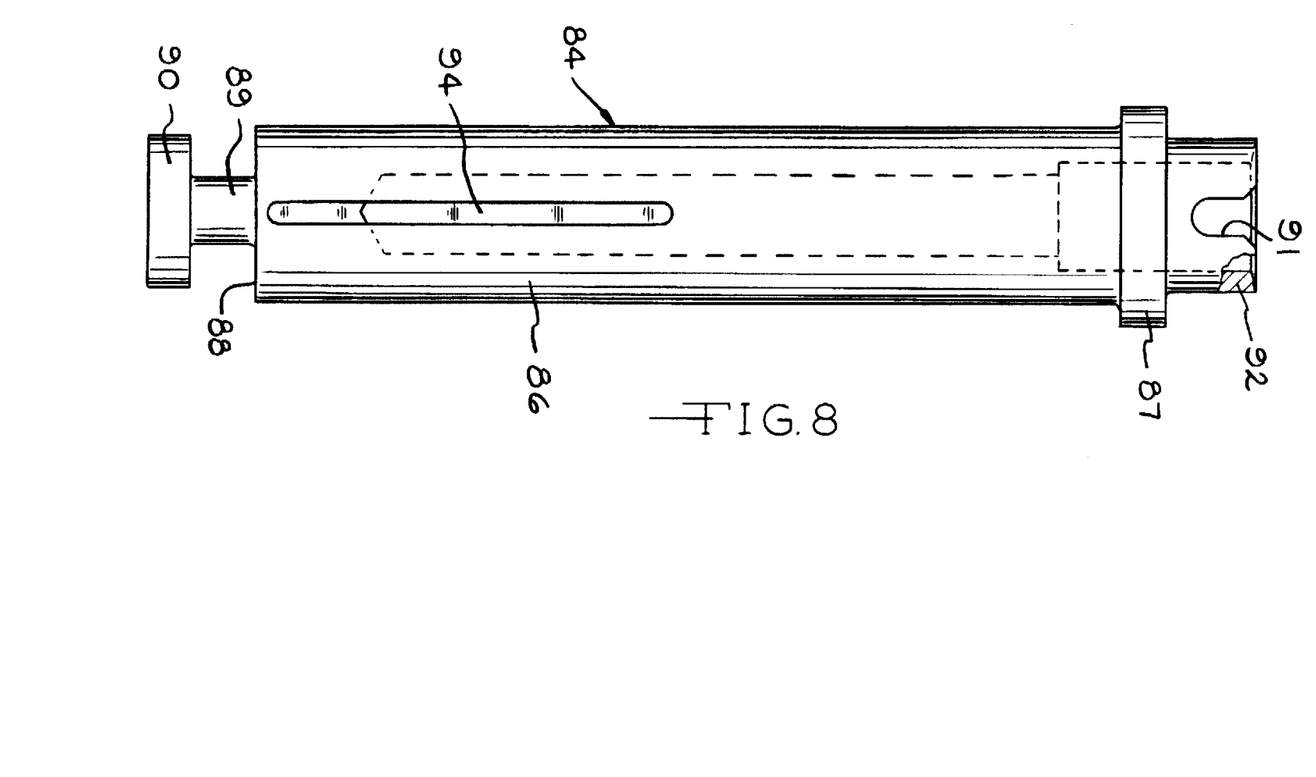
FIG. 8 is a view of the fixture for supporting the ball valve assembly throughout the loading and deforming steps.

As may be seen particularly in FIG. 8, each of the fixtures 84 has a generally cylindrical side wall and extends from an upper end having an enlarged collar 87 to a lower end 88. Extending from the lower end 88 of the main body portion 86 of the fixture 84 is a post 89 having an enlarged head 90. Extending upwardly from the collar 87 is a cylindrical wall 92 having an inner surface which is sized to receive therein the field stub 54 and that portion of the body member 10 between the outlet end 12 and the radial shoulder 29. The upper end of the cylindrical wall 92 is provided with a cutout portion 91 at its upper end. The cutout portion 91 has a size which permits the charge port 33 to be positioned therein such that the partially assembled rotary ball valve of the present invention may be support thereon with the radial shoulder 29 resting upon the upper end of the cylindrical wall 92. When so positioned, the remainder of the rotary ball valve and the undeformed stub tubing 20A will extend upwardly therefrom as shown in FIGS. 3 through 6.

The fixture 84 also includes a slot 94 extending parallel to the axis of the fixture 84. The dial plate 81 is mounted for rotation about the axis X by conventional power and support structure to carry the housings 82 and their associated fixtures 84 on an intermittent rotational basis throughout the various stations, including the forming station shown on the left of FIG. 3 and a load/remove station shown on the right of FIG. 3.

As can be seen, the fixture 84 which is positioned at the forming station on the left of FIG. 3 has positioned thereon the assembled, but not yet deformed ball valve which was positioned on the fixture 84 at one of the remote stations, such as the station located at the right side of FIG. 3 or one located 60° or 90° therefrom depending on the number of stations.

The power means 100 for rotating the dial plate 81 is supported on a table top 101. The table top 101 is rigidly mounted to the floor by a plurality of structural members 103.

Affixed to the table top 101 is an air cylinder 104 having a piston carrying a mounting block 105 for movement from a lowered position adjacent the table top 101 (FIG. 3) to an elevated position as shown in FIGS. 4 and 5. Rigidly affixed to the mounting block 105 are a pair of jaws having vertical legs 107 affixed to the mounting block 105 and horizontal legs 108 extending therefrom in a direction extending toward the opposing jaw. The horizontal legs 108 of the opposing jaws have inwardly facing ends which are spaced apart from each other a distance which is greater than the diameter of the post 89 extending from the lower end 88 of each of the fixtures 84, but less than the diameter of the enlarged head 90. The distance between the vertical legs 107 is larger than the diameter of the enlarged head 90. As a result, upon rotation of the dial plate, the post 89 and enlarged head 90 of the fixture approaching the forming station shown on the left side of FIG. 3 will enter the space between the vertical legs 107 with the post 89 being positioned in the gap between the end portions of the horizontal legs 108 of the opposing jaws. When the fixture 84 with the assembled, but not yet deformed rotary ball valve of the present invention arrives at this station, the machine 80 is ready for actuation to compress the spring 70 and electromagnetically deform the cylindrical tubing 20A to complete the final assembly of the rotary ball valve assembly V.

Extending upwardly from the table top 101 is a vertical support member 110 carrying brackets 111 and a mounting plate 112 to which is affixed an air cylinder 113 controlled by a precision air regulator. Extending from the cylinder 113 is a rod 114 which is moveable in the vertical direction by the cylinder 113. The rod extends through an alignment coupler 115 and joins with a load cell 116 which functions as a strain gauge to measure the amount of load generated by the cylinder 113 when it is actuated to extend the rod 114. Also connected for movement vertically with the rod 114 is a mandrel 117 which extends through a bearing housing 118 having a sleeve bearing positioned therein.

Also mounted on the machine 80, in a fixed position thereon, is a wave shaper 120 and a coil 121. The wave shaper 120 has an annular configuration with a cylindrical wall 122 defining a passageway 123 sized to receive therein the cylindrical tube 20A in close proximity, but slightly spaced therefrom. The wave shaper has a radial flange 124. The coil 121 encircles the cylindrical wall 122 of the wave shaper and abuts the radial flange 124. The coil 121 is connected by electrical cables to a suitable power supply having capacitors with stored energy of up to 32 kilojoule. For example, the electromagnetic forming portion of the machine 80 including the power supply could be one such as that sold by Maxwell Magneform, San Diego, Calif. and sold under the trademark MAGNEFORM®.

With the assembled, but undeformed rotary ball valve positioned on the fixture 84 and the dial plate 81 indexed to carry the thus mounted undeformed rotary ball valve assembly to the position shown in FIG. 3, the air cylinder 104 is actuated to extend its rod and the mounting block 105 and jaws upwardly carrying the fixture 84 and supported rotary ball valve assembly to the position shown in FIG. 5 at which the cylindrical tube 20A in undeformed condition extends through the passageway 123 of the wave shaper 120. The fixture 84 is elevated to a position at which the upper portion of the compression spring 70 is substantially centered on the coil 121. The air cylinder 113 is then actuated to lower the mandrel 117 which engages the washer 74 and compresses the compression spring 70. It will be noted from FIG. 5 that when at such position, the mandrel 117 extends through the opening defined by the washer 74 and the compression spring 70 and into the central passage 41 of the ball 40. The load cell 116 measures the amount of preload placed on the compression spring by the mandrel 117 resulting from pressure of the air cylinder 113. The amount of load to be placed upon such spring depends upon the size of the valve; however, it should be in the range of 400 to 500 pounds for a No. 14. ball valve size. A controller operating in conjunction with the load cell 116 prevents the actuation of the electromagnetically forming mechanism unless it ascertains that the amount of load placed by the mandrel on the spring is within a tolerance of the specified optimum for that size spring.

Assuming the amount of load placed on the spring is within the specified limits, the electromagnetic power supply is actuated, thereby causing the copper cylindrical tube 20A to have an annular portion radially deformed inwardly, thus forming the annular groove 76 which bears against the washer 74 to hold the compression spring 70 firmly in place applying appropriate compression to the seat 60 to seal it against the rotary ball 40 and the rotary ball 40 to urge it into sealing engagement with the annular seal 50.

The air cylinder 113 may then be reversed to remove the mandrel 117 from the ball valve assembly V. Similarly, the air cylinder 104 is actuated to retract and lower the fixture 84 and the ball valve assembly V to a position below the wave shaper 120 and coil 121. The dial plate 81 may then be indexed 60° (assuming a six station machine) to a position at which the rotary ball valve V may be removed from the machine. It will be noted that the rotary ball valve as removed from the machine has the factory stub with a cylindrical wall portion, except for the annular groove 76 formed by the electromagnetic forming process. It will normally be desired to swage the factory stub 20 by conventional swaging techniques to the configuration shown in the finished ball valve assembly of FIG. 1. Additionally, as shown in FIGS. 1 and 7, an end cap 34 may be applied to the actuation port 30 and to the charge port 33.

Figure 9:
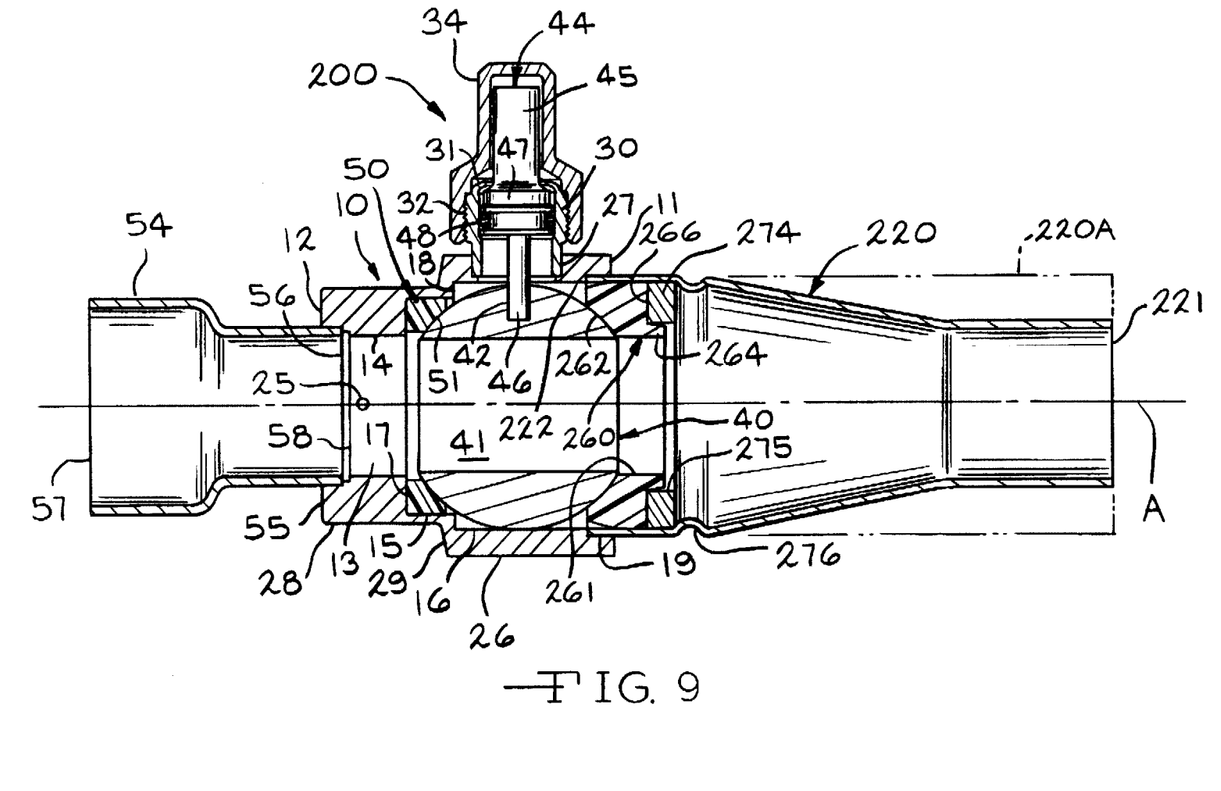
FIG. 9 is a view similar to FIG. 1 showing another embodiment.

For some applications, it has been found satisfactory to provide a ball valve assembly without utilization of a compression spring. This is shown in FIG. 9 where there is provided a rotary ball valve assembly generally designated by the numeral 200. As can be readily seen, those parts of the ball valve assembly, other than the seat from the inlet end 11 of the body member 10 to the outlet end 12 are identical to those parts shown in the embodiment of FIG. 1. As may be seen in FIG. 9, the spring which was utilized in the previous embodiment has been eliminated. However, even with the elimination of the spring, it is important that the ball valve assembly 200 be assembled and the groove retaining the washer and the seat be subjected to an axial force, preferably non-torsional, during the inward deformation of the tubular member. As shown in FIG. 9, a seat 260 having a spherical surface 262 contoured to sealingly engage the ball 40 is positioned such that the spherical surface 262 is engaged to the ball. The seat 260 is provided with a nose 264 and a shoulder 266 extending radially outwardly from the nose 264. If desired, the seat 260 may be formed without the nose and simply extend radially outwardly from the passageway 261 to the shoulder 266.

A factory stub 220 is shown brazed in the first counter bore 19 at the inlet end 11 of the body member 10. As may be seen in dashed lines in FIG. 9, the factory stub 220 was originally simply a cylindrical tube 220A. The factory stub extends from a first end 221 to a second end 222.

A washer 274 having an outer diameter permitting it to be received in the cylindrical tube 220A is positioned in engagement with the shoulder 266 of the seat 260. The washer 274 has an aperture 275. For those situations in which the seat 260 is provided with a nose 264, the size of the aperture 275 of the washer 274 is sufficiently large to permit the nose 264 to extend therethrough so that the washer 274 is engaged to the outwardly extending shoulder 266 in face-to-face relationship.

With the parts so positioned, an axial force is applied as in the embodiment of FIGS. 1 through 8 and, while the assembled components are subjected to such axial force urging the seat 260 into sealing engagement with the ball 40 and the ball 40 into sealing engagement with the seal 50, the cylindrical tube 220A is subjected to electromagnetic forming in the machine 80 to form an inwardly extending annular groove 276 which engages the washer 274 in a position sealingly urging the seat 260 against the ball 40 and the ball 40 sealing against the seal 50.

For those embodiments where a compression spring is desired to be used, it is within the contemplation of the scope of the present application that many of a wide variety of types of compression springs may be utilized in lieu of the specific type of compression spring 70 described in the embodiment of FIGS. 1 and 2.

Many other modifications will become readily apparent to those skilled in the art. Accordingly, the scope of the present invention should be determined only by the scope of the claims appended hereto.

We claim:

1. A method for assembling a rotary valve assembly comprising
   (a) providing a housing extending along an axis and having an inlet and an axially aligned outlet, a ball having a passageway extending therethrough, an annular seat engageable with said ball, an annular seal sealingly engageable with said ball, a compression spring and a tubular member;
   (b) assembling the parts of step (a) with the ball in said housing and with said annular seal engaging said ball in a position between said ball and said outlet, with said annular seat engaging said ball between said ball and said inlet, with said compression spring positioned to urge said annular seat against said ball and with said tubular member engaged to said housing in a position encircling said compression spring;

(c) applying a non-torsional, axially directed compressive force to said compression spring to urge said annular seat into engagement with said ball and said ball into sealing engagement with said annular seal; and, (d) while said compressive force is being applied, inwardly deforming a portion of said tubular member to form an abutment to retain said compression spring in said tubular member while said compression spring is urging said annular seat into engagement with said ball.

2. The method according to claim 1 further including the step of measuring the compressive force being applied to said spring and, if, but only if, said compressive force is within a predetermined range, proceeding with step (d).

3. The method according to claim 1 wherein said abutment is an annular abutment and is formed without contacting said tubular member in the area of said annular abutment.

4. The method according to claim 1 wherein said abutment is formed by electromagnetic forming while an axial compressive force is applied to said compression spring.

5. The method of according to claim 4 further including the step of measuring the compressive force being applied to said spring and, if, but only if, said compressive force is within a predetermined range, proceeding with said electromagnetic forming.

6. The method according to claim 1 wherein said compression spring is provided with wound coils having a series of alternating grooves and crests with the crests of alternating coils being aligned with grooves of adjacent coils and said compression spring is subjected to non-torsional, axially directed forces while said abutment is formed.

7. A method for assembling a ball valve assembly having a housing, a ball positioned in said housing, an annular seal engaging said ball, an annular seat engaging said ball, a spring positioned to transmit forces to said annular seat and a tubular member extending from said housing comprising the steps of:

(a) applying a compressive force to said spring to urge said annular seat against said ball and said ball against said annular seal; and (b) inwardly deforming said tubular member to retain said spring in said tubular member with said spring urging said annular seat into engagement with said ball, said inwardly deforming step occurring during step (a).

8. A method according to claim 7 wherein said deforming step is performed by electromagnetic forming.

9. The method according to claim 7 further including the step of measuring the compressive force being applied to said spring and, if, but only if, said compressive force is within a predetermined range, proceeding with step (b).

10. The method according to claim 7 wherein said deforming is achieved without contacting said tubular member in the area of said inward deformation.

11. The method according to claim 7 wherein said deforming is performed by electromagnetic forming while an axial compressive force is applied to said spring.

12. The method according to claim 12 further including the step of measuring the compressive force being applied to said spring and, if, but only if, said compressive force is within a predetermined range, proceeding with said electromagnetic forming.

13. The method according to claim 7 wherein said spring is provided with wound coils having a series of alternating grooves and crests with the crests of alternating coils being aligned with grooves of adjacent coils and said compression spring is subjected to non-torsional, axially directed forces while said step of deforming is performed.

* * * * *

UNITED STATES PATENT AND TRADEMARK OFFICE
CERTIFICATE OF CORRECTION

PATENT NO. : 5,735,047

DATED : April 7, 1998

INVENTOR(S) : Robert J. Evans et al.

It is certified that error appears in the above-identified patent and that said Letters Patent is hereby corrected as shown below:

In claim 12 at column 10, line 24, please delete "claim 12" and insert --claim 11--.

Signed and Sealed this

Twentieth Day of October, 1998

Attest:

BRUCE LEHMAN

Attesting Officer

Commissioner of Patents and Trademarks